UNITED STATES PATENT OFFICE.

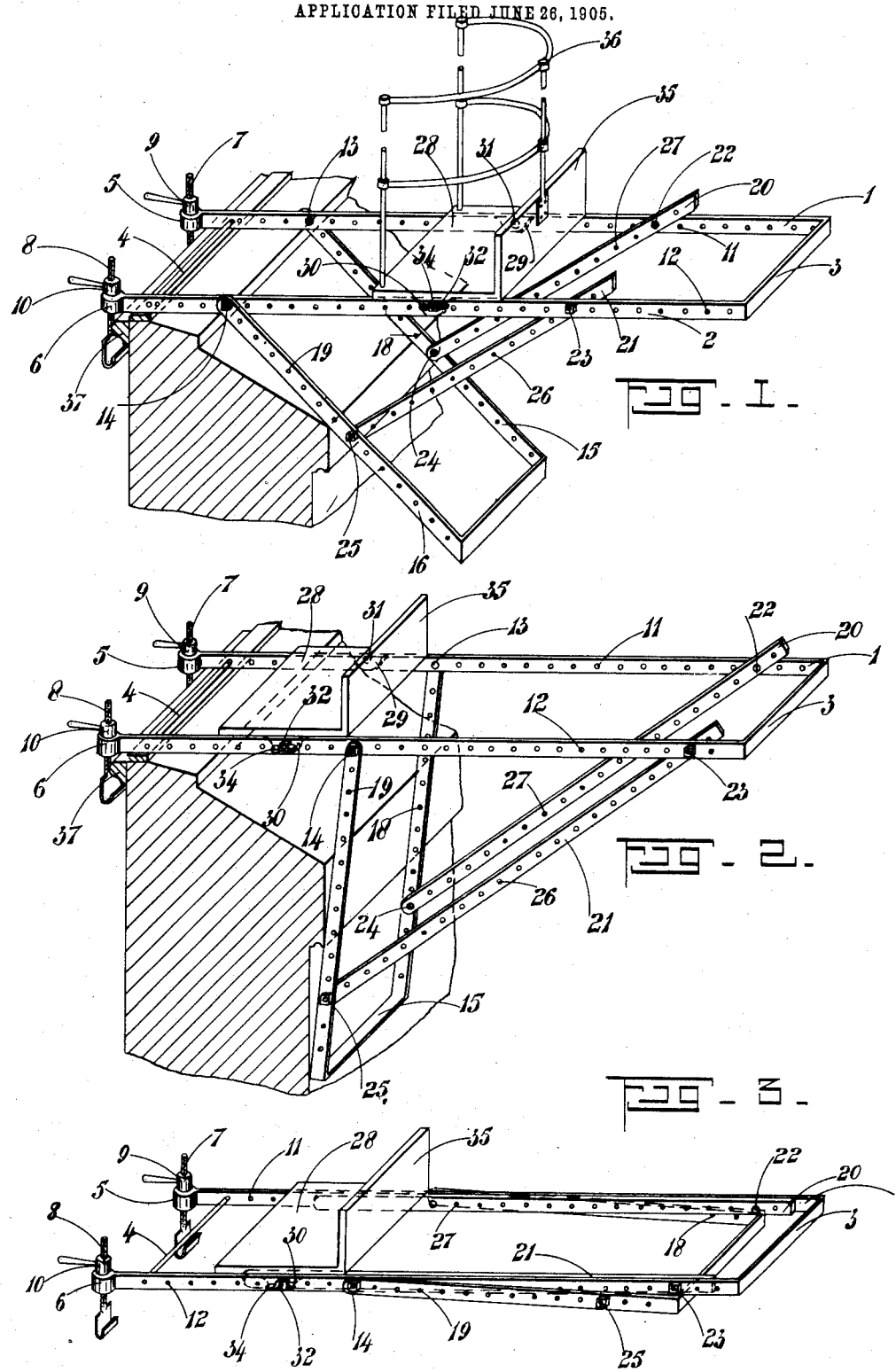

CHARLES MILLS, OF WOOLSTON, NEAR CHRISTCHURCH, NEW ZEALAND.

ADJUSTABLE BRACKET FOR SUPPORTING PLATFORMS.

No. 829,537.   Specification of Letters Patent.   Patented Aug. 28, 1906.

Application filed June 26, 1905. Serial No. 267,164.

*To all whom it may concern:*

Be it known that I, CHARLES MILLS, painter and glazier, a subject of His Majesty the King of Great Britain and Ireland, residing at 33 Ferry road, Woolston, near Christchurch, in the Provincial District of Canterbury, in the Colony of New Zealand, have invented certain new and useful Improvements in Adjustable Brackets for Supporting Platforms, of which the following is a specification.

This invention provides a bracket which may be adjusted upon a window-sill to carry a platform upon which a person may be supported while cleaning a window upon the outside or while performing other operations, such as painting the framework of the window.

In my invention I employ an upper and lower member pivoted together and stay-bars between the two members. The upper member has means at one end whereby it may be attached to a window-sill, and this member is supported in a horizontal position by the lower member and the stay-bars. A platform is provided upon the upper member and may have a guard to prevent the operator falling off. Each of the members and stay-bars is provided with holes for adjusting the bracket upon the window-sill.

In the drawings accompanying this specification, Figure 1 is a side perspective elevation showing one way, and Fig. 2 a similar elevation showing another way, of using the bracket. Fig. 3 shows a bracket folded up when not in use.

The upper member comprises two parallel bars 1 and 2, united at their outer ends by a cross-bar 3 and at their inner ends by a cross-rod 4. Upon the inner ends respectively of the bars 1 and 2 is formed an eye 5 and 6, through which screw-threaded hooks 7 and 8 are passed and held in position by wing-nuts 9 and 10.

A plurality of holes 11 and 12 are provided in the bars 1 and 2, through which bolts 13 and 14 are passed, whereby the lower member of the bracket may be pivoted to the upper member. This lower member comprises parallel bars 15 and 16, united at their outer ends by a cross-bar 17 and provided with a plurality of holes 18 and 19. Stay-bars 20 and 21, one on each side of the bracket, are pivoted to the upper member by bolts 22 and 23 and to the lower member by bolts 24 and 25. A plurality of holes 26 and 27 are provided in the stay-bars 20 and 21.

A platform 28 has angle-brackets 29 and 30 fixed to its lower side, and bolts 31 and 32 pass through the angle-brackets and the bars 1 and 2, wing-nuts 33 and 34 being provided upon the bolts. The platform is provided with an end piece 35 and, as shown in Fig. 1, may be provided with a guard 36, attached to and surrounding the platform.

To adjust the bracket upon the window-sill, the hooks 7 and 8 are made to engage a bead 37 on the inside of a window and the nuts 9 and 10 are adjusted until the bars 1 and 2 are horizontal when resting upon the window-sill. The lower member is then adjusted upon the upper member until it rests upon the sill, as shown in Fig. 1, or until it is vertical and resting against the outside of the building, as shown in Fig. 2. The stay-bars 20 and 21 are then adjusted upon the upper member and the lower member to maintain the upper member securely in position.

What I claim, and desire to secure by Letters Patent of the United States, is—

For the purpose indicated a bracket comprising in combination an upper member consisting of two parallel bars and an integral outer end piece, there being a plurality of holes in the parallel bars, a cross-rod uniting the inner ends of the said bars, eyes integral with the said inner ends, screw-threaded hooks passing through the said eyes and adapted to engage a bead inside the window, nuts upon the threaded ends of the hooks, a lower member consisting of two parallel bars and an integral outer end piece there being a plurality of holes in the parallel bars, bolts whereby the lower member is pivoted to the upper member stay-bars having a plurality of holes, bolts pivoting the stay-bars at one end to the upper member and at the lower end to the lower member, a platform angle-brackets secured to the lower side of the platform bolts passing through the upper member and the brackets to secure the platform in position, and a vertical end piece to the platform, as set forth.

In testimony whereof I have signed my name to this specification in the presence of two witnesses.

CHARLES MILLS.

Witnesses:
A. H. HART,
L. R. SMITH.